US010222256B2

United States Patent
Nayak

(10) Patent No.: US 10,222,256 B2
(45) Date of Patent: Mar. 5, 2019

(54) AMBIENT LIGHT SENSOR SYSTEM HAVING LIGHT-SCATTERING DESICCANT

(71) Applicant: Apple Inc., Cupertino, CA (US)

(72) Inventor: Aditya B. Nayak, San Jose, CA (US)

(73) Assignee: Apple Inc., Cupertino, CA (US)

( * ) Notice: Subject to any disclaimer, the term of this patent is extended or adjusted under 35 U.S.C. 154(b) by 114 days.

(21) Appl. No.: 15/384,102

(22) Filed: Dec. 19, 2016

(65) Prior Publication Data

US 2018/0080815 A1 Mar. 22, 2018

Related U.S. Application Data

(60) Provisional application No. 62/398,178, filed on Sep. 22, 2016.

(51) Int. Cl.
| | |
|---|---|
| *G09G 5/00* | (2006.01) |
| *G01J 1/04* | (2006.01) |
| *G01J 1/42* | (2006.01) |
| *G02B 5/20* | (2006.01) |
| *G02B 5/02* | (2006.01) |

(Continued)

(52) U.S. Cl.
CPC ........... *G01J 1/0474* (2013.01); *G01J 1/0418* (2013.01); *G01J 1/0488* (2013.01); *G01J 1/4204* (2013.01); *G02B 5/0242* (2013.01); *G02B 5/208* (2013.01); *G02B 5/223* (2013.01); *G09G 5/02* (2013.01); *G09G 5/10* (2013.01); *G09G 2360/144* (2013.01)

(58) Field of Classification Search
CPC ...... G09G 2360/14–2360/148; G02F 1/13318; G02F 2201/58; H04N 5/58; G01J 1/4204
See application file for complete search history.

(56) References Cited

U.S. PATENT DOCUMENTS 5,256,473 A * 10/1993 Kotani ................. C08J 5/18
241/21
6,833,668 B1 * 12/2004 Yamada ............. H01L 51/5246
313/505

(Continued)

FOREIGN PATENT DOCUMENTS

| EP | 1655792 A1 | 5/2006 |
|---|---|---|
| JP | 2000223265 A | 8/2000 |

(Continued)

*Primary Examiner* — Gene W Lee

(74) *Attorney, Agent, or Firm* — Treyz Law Group, P.C.; G. Victor Treyz; Kendall W. Abbasi

(57) ABSTRACT

An ambient light sensor system may be mounted in alignment with a window in a display cover layer associated with a display in an electronic device. The ambient light sensor system may have a light diffuser layer and an infrared-light-blocking filter. The light diffuser layer may have a polymer layer with embedded light-scattering desiccant particles. An ambient light sensor in the ambient light sensor system may receive ambient light through the light diffuser layer and the infrared-light-blocking filter. The infrared-light-blocking filter may have a polymer substrate and a thin-film interference filter formed from a stack of inorganic thin-film layers on the polymer substrate. Light-scattering desiccant particles may be incorporated into the polymer substrate of the infrared-light-blocking filter. Desiccant may also be incorporated into ambient light sensor support structures.

18 Claims, 9 Drawing Sheets

(51) Int. Cl.
*G02B 5/22* (2006.01)
*G09G 5/02* (2006.01)
*G09G 5/10* (2006.01)

(56) References Cited

U.S. PATENT DOCUMENTS

| | | | |
|---|---|---|---|
| 9,891,098 B2* | 2/2018 | Shedletsky | G02F 1/13318 |
| 2006/0132034 A1 | 6/2006 | Cho et al. | |
| 2007/0013291 A1* | 1/2007 | Cok | B82Y 20/00 |
| | | | 313/501 |
| 2008/0124522 A1* | 5/2008 | Chuman | H01L 21/76888 |
| | | | 428/141 |
| 2012/0170284 A1* | 7/2012 | Shedletsky | G02F 1/13318 |
| | | | 362/355 |
| 2013/0105668 A1* | 5/2013 | Ho | G09G 3/3413 |
| | | | 250/214 AL |
| 2014/0211144 A1* | 7/2014 | Shinohara | G02F 1/1339 |
| | | | 349/153 |

FOREIGN PATENT DOCUMENTS

| | | |
|---|---|---|
| WO | 2001019142 A1 | 3/2001 |
| WO | 2006034274 A2 | 3/2006 |
| WO | 2006047149 A1 | 5/2006 |

* cited by examiner

… (1 / 10)

AMBIENT LIGHT SENSOR SYSTEM HAVING LIGHT-SCATTERING DESICCANT

This application claims the benefit of provisional patent application No. 62/398,178, filed Sep. 22, 2016, which is hereby incorporated by reference herein in its entirety.

FIELD

This relates generally to electronic devices, and, more particularly, to light sensors for electronic devices.

BACKGROUND

Electronic devices such as laptop computers, cellular telephones, and other equipment are sometimes provided with light sensors. For example, ambient light sensors may be incorporated into a device to provide the device with information on current lighting, conditions. Ambient light readings may be used in controlling the device. If, for example bright daylight conditions are detected, an electronic device may increase display brightness to compensate.

Ambient light conditions sometimes include significant changes in color. For example, an electronic device may be used in a cool color temperature environment such as outdoors shade or warm color temperature environment such as an indoors environment that is lit with incandescent lighting. Content that appears to be correctly displayed on a display in one of these environments may have an unpleasant color cast in the other environment. For example, a display that is properly adjusted in an outdoors environment may appear overly cool under incandescent lighting. To allow adjustments of display color based on ambient light color measurements, electronic devices may be provided with color ambient light sensors.

Ambient light sensor systems can be challenging to design. If care is not taken, ambient light sensors will be overly sensitive to the variations in the angle-of-incidence of light, will be affected by noise from infrared light, and will degrade due to environmental effects.

SUMMARY

An electronic device may be provided with an ambient light sensing system. The ambient light sensing system may have an ambient light sensor such as a color ambient, light sensor that is mounted in alignment with a window in a display cover layer associated with a display in the electronic device.

The ambient light sensing system may have a light diffuser layer and an infrared-light-blocking filter. The light diffuser may have a polymer light diffuser layer with embedded light-scattering desiccant particles. The color ambient light sensor may receive ambient light through the light diffuser layer and the infrared-light-blocking filter. The infrared-light-blocking filter may have a polymer substrate and a thin-film interference filter formed from a stack of inorganic thin-film layers on the polymer substrate. Light-scattering desiccant particles may be incorporated into the polymer substrate of the infrared-light-blocking filter. Polymer coating layers and other layers in the light diffuser and filter may also include light-scattering desiccant particles.

Desiccant may be incorporated into ambient light sensor support structures that hold the ambient light sensor in alignment with the window in the display cover layer. For example, desiccant particles can be incorporated into a polymer or other material that is used in forming a housing, or other support structure that holds an ambient light sensor in alignment with the window in the display cover layer.

If desired, the desiccant particles can absorb infrared light while passing (scattering) visible light. Infrared-light-absorbing desiccant particles may help enhance the amount of infrared light that is blocked and may therefore help reduce dependence on the infrared-light-blocking filter to block infrared light.

DETAILED DESCRIPTION

Figure 1:
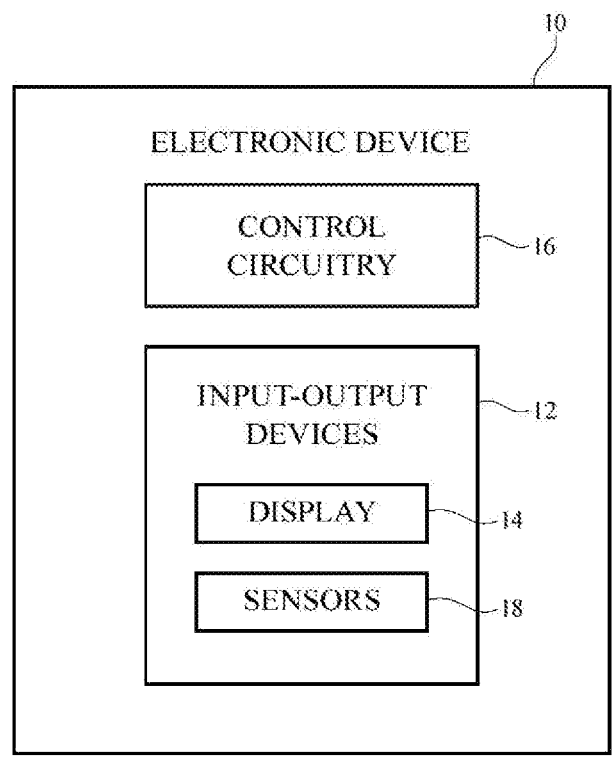
FIG. 1 is a schematic diagram of an illustrative electronic device having an ambient light sensor in accordance with an embodiment.

An illustrative electronic device of the type that may be provided with one or more light sensors is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation, device, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, light-emitting diodes and other status indicators, data ports, etc. A user can control the operation of device 10 by supplying commands through input-output devices 12 and may receive status information and other output horn device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Input-output devices 12 may also include sensors 18. Sensors 18 may include one or more ambient light sensors and other sensors (e.g., a capacitive proximity sensor, a light-based proximity sensor, a magnetic sensor, an accelerometer, a force sensor, a touch sensor, a temperature sensor, a pressure sensor, a compass, a microphone or other sound sensor, or other sensors).

Ambient light sensors for device 10 may be used to gather information on the intensity of ambient light and, if desired, ambient light color. Monochromatic ambient light sensors may be used to make ambient light intensity measurements so that device 10 can automatically adjust display brightness or take other actions based on ambient light levels. Color ambient light sensors can measure intensity and color information (e.g., color temperature, etc.). Device 10 may also include light detectors that measure light associated with a light-based proximity sensor or other incoming light. Illustrative configurations in which device 10 includes a color ambient light sensor may sometimes be described herein as an example. If desired, device 10 may include one or more light detectors such as one or more ambient light sensors and these ambient light sensors may be monochrome ambient light sensors and/or color ambient light sensors.

A color ambient light sensor for device 10 may have an array of detectors each of which is provided with a different respective color filter or other structures that provide that detector with sensitivity to a particular spectral range (e.g., a particular color in the visible light spectrum). Information from the detectors may be used to measure the total amount of ambient light that is present in the vicinity of device 10. For example, the ambient light sensor may be used to determine whether device 10 is in a dark or bright environment. Based on this information, control circuitry 16 can adjust display brightness for display 14 or can take other suitable action. The array of colored detectors may also be used to make color measurements (i.e. the ambient light sensor may be a color ambient light sensor). Color measurements may be gathered as color coordinates, color temperature, or correlated color temperature. Processing circuitry may be used to convert these different types of color information to other formats, if desired (e.g., a set of color coordinates may be processed to produce an associated correlated color temperature, etc.).

Ambient light color information and ambient light intensity information from a color sensing ambient light sensor can be used to adjust the operation of device 10. For example, the color cast of display 14 may be adjusted in accordance with the color of ambient lighting conditions. If for example, a user moves device 10 from a cool lighting environment to a warm lighting environment (e.g., an incandescent light environment), the warmth of display 14 may be increased accordingly, so that the user of device 10 does not perceive display 14 as being overly cold. In general, any suitable actions may be taken based on color measurements and/or total light intensity measurements (e.g., adjusting display brightness, adjusting display content, changing audio and/or video settings, adjusting sensor measurements from other sensors, adjusting which on-screen options are presented to a user of device 10, adjusting wireless circuitry settings, etc.).

Figure 2:
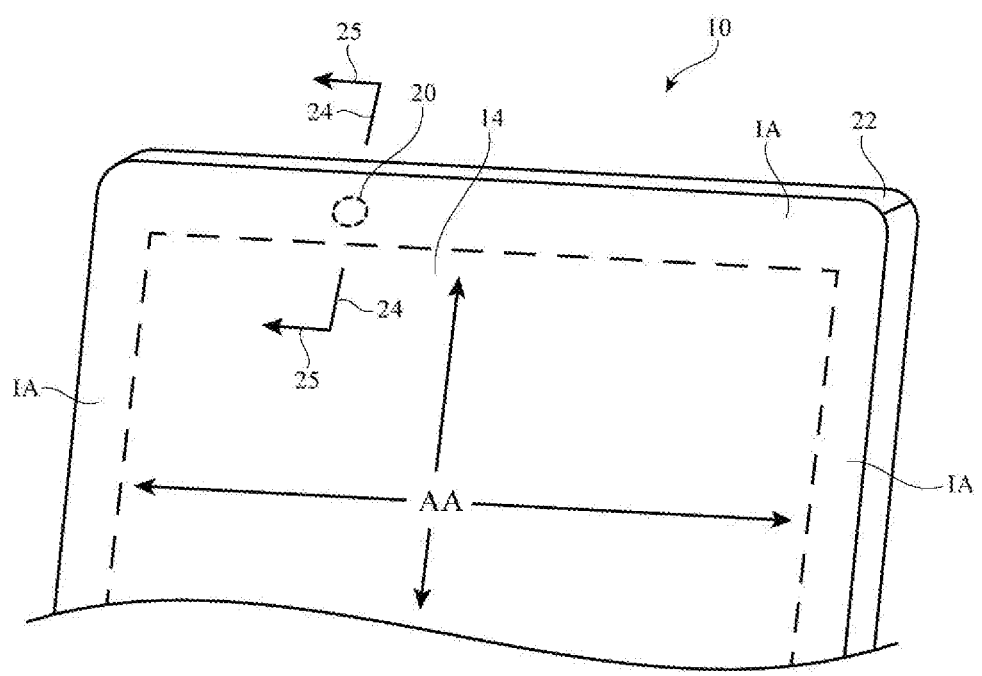
FIG. 2 is a perspective view of a portion of an electronic device display within which an ambient light sensor has been mounted in accordance with an embodiment.

A perspective view of a portion of an illustrative electronic device is shown in FIG. 2. In the example of FIG. 2, device 10 includes a display such as display 14 mounted in housing 22. Housing 22, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 22 may be formed using a unibody configuration in which some or all of housing 22 is machined or molded as a single structure or may be formed using multiple structures (e.g. an internal frame structure, one or more structures that form exterior housing surfaces, etc.).

Display 14 may be protected using a display cover layer such as a layer of transparent glass, clear plastic, sapphire, or other clear layer. Openings may be formed in the display cover layer. For example, an opening may be formed in the display cover layer to accommodate a button, a speaker port, or other components. Openings may be formed in housing 22 to form communications ports (e.g., an audio jack port, a digital data port, etc.), to form openings for buttons, etc.

Display 14 may include an array of display pixels formed from liquid crystal display (LCD) components, an array of electrophoretic pixels, an array of plasma pixels, an array of organic light-emitting diode pixels or other light-emitting diodes, an array of electrowetting pixels, or pixels based on other display technologies. The array of pixels of display 14 forms an active area AA. Active area AA is used to display images for a user of device 10. Active area AA may be rectangular or may have other suitable shapes.

Active area AA may cover the entire front face of device 10 (as an example) or an inactive region such as inactive border area IA may run along one or more edges of active area AA. Inactive border area IA may contain circuits, signal lines, and other structures that do not emit light for forming images. To hide inactive circuitry and other components in border area IA from view by a user of device 10, the underside of the outermost layer of display 14 (e.g., the display cover layer or other display layer) may be coated with an opaque masking material such as a layer of black ink. Optical components (e.g., a camera, a light-based proximity sensor, an ambient light sensor, status indicator light-emitting diodes, camera flash light-emitting diodes, etc.) may be mounted under inactive border area IA or may be mounted under small windows in display 14 that are located in active area AA. Optical components may also be mounted in ports in housing 12. Configurations for device 10 in which optical components are mounted under inactive border area IA may sometimes be described herein as an example.

If desired, one or more openings (sometimes referred to as windows) may be formed in an opaque masking layer formed on the underside of a display cover layer in inactive area. IA of display 14 to accommodate optical components. For example, alight component window such as an ambient light sensor window may be formed in a peripheral portion of display 14 such as, region 20 in inactive border area IA. Ambient light from the exterior of device 10 may be measured by an ambient light sensor in device 10 after passing through region 20 and the display cover layer.

Figure 3:
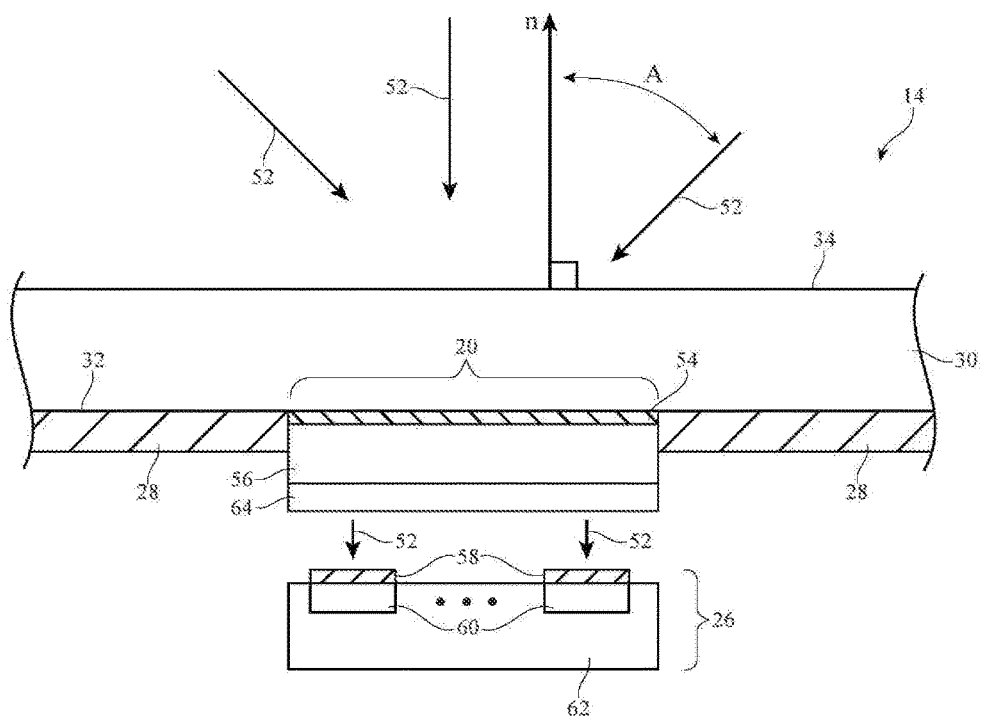
FIG. 3 is a cross-sectional side view of an illustrative light sensor that is being exposed to ambient light in accordance with an embodiment.

FIG. 3 is a cross-sectional side view of display 14 of FIG. 2 taken along line 24 and viewed in direction 25 of FIG. 2. As shown in FIG. 3, light sensor 26 may be mounted in alignment with window 20. Window 20 may have a circular shape, a square shape, a shape with curved and/or straight edges, a circular ring shape with a central opaque region, or any other suitable shape. The diameters of window 20 may be 0.1 to 1 mm, less than 2 mm, more than 0.05 mm, or other suitable size. Light sensor 26 may be a color sensing ambient light sensor that is used in measuring ambient light in the vicinity of device 10. As shown in FIG. 3, display 14 may have an outermost layer such as display cover layer 30. Display cover layer 30 has an outer surface such as surface 34. Surface normal n is perpendicular to surface 34. Rays of ambient light 52 are characterized by various angles of incidence A measured with respect to surface normal n.

Window 20 may be formed from an opening in opaque masking layer 28 on inner surface 32 of display cover layer 30 in inactive area IA. Layer 30 may be formed from glass, plastic, ceramic, sapphire, or other transparent materials and may be a part of a display module for display 14 or may be a separate, protective layer that covers active display structures. The opening associated with window 20 may be filled with optical structures such as ambient light sensor ink 54, light diffuser 56, and infrared-light-blocking filter 64 and may be aligned with color ambient light sensor 26.

Ambient light sensor ink 54 may have sufficient transparency at visible wavelengths to allow sensor 26 to operate (e.g., to allow sensor 26 to receive ambient light 52 through ink 54), while at the same time enhancing the outward appearance of window 20 (e.g., by partly obscuring the presence of window 20 to a user of device 10 by making window 20 have a visual appearance that is not too dissimilar from the portion of layer 30 that includes layer 28). If desired, ambient light sensor ink 54 may be omitted (e.g., sensor 26 may be mounted under a clear window in layer 28. Configurations in which layer 28 has sufficient transparency to allow visible light to pass through layer 28 to sensor 26 may also be used. Arrangements of the type shown in FIG. 3 in which incoming ambient light 52 passes through a window having ambient light sensor ink 54 in an opening in layer 28 that is aligned with diffuser 56 and infrared-light-blocking filter 64 may sometimes be described herein as an example.

Sensor 26 may have multiple light detectors 60 (e.g., photodiodes, phototransistors, or other semiconductor photodetector structures). Light detectors 60 may be formed in an array on a common semiconductor substrate (die) such as substrate 62 or may be formed using two or more substrates.

Each of light detectors 60 may be provided with a corresponding color filter 58, To provide sensor 26 with the ability to accurately measure colors, sensor 26 may include two or more detectors 60 (e.g., 2-10 detectors, 3-8 detectors, 4-7 detectors, 5-7 detectors, only 4 detectors or more than 4 detectors, only 5 detectors or more than 5 detectors, only 6 detectors or more than 6 detectors, only 7 detectors or more than 7 detectors, only 8 detectors or more than 8 detectors, fewer than 8 detectors, or any other suitable number of detectors). Filters 58 may be thin-film interference filters and/or may be colored layers of polymer or other color filter elements (e.g., colored filters formed from dyes and/or pigments).

Light diffuser (light diffuser layer) 56 may be used to gather light 52 from a variety of angles of incidence A and to effectively pass this light to sensor 26. Light diffuser 56 may include light-scattering particles (and, if desired, protrusions, recesses, and/or other light-scattering features) that help redirect off-axis ambient light rays into sensor 26 at an angle that is close to perpendicular to the surface of substrate 62, thereby reducing the dependence of ambient light readings on the relative orientation between device 10 and the sources of ambient light.

Infrared-light-blocking filter (filter layer) 64, which may sometimes be referred to as a visible-light-passing-and-infrared-light-blocking filter or infrared cut filter, may allow visible ambient light to pass and may block infrared light (e.g., near-infrared light at wavelengths of 700 nm to 2500 nm or at other near-infrared wavelengths). Filter 64 may include a substrate formed from a polymer film and/or other materials (e.g., glass, etc.) and may include a stack of thin films that form a thin-film interference filter that blocks infrared light (as an example). If desired, filter 64 may be formed from a material with bulk infrared-light-absorption and visible-light-transparency properties (e.g., a thin metal layer such as a thin layer of silver or gold, a semiconductor layer, etc.). This material may be incorporated into filter 64 above or below a thin-film interference filter stack that blocks infrared light while transmitting visible light or may be used in place of the thin-film interference filter structure (e.g., filter 64 may be formed exclusively from a material that absorbs infrared light and transmits visible light without using multiple alternating refractive index layers to form a thin-film interference filter). By filtering out infrared light from light 52, noise in sensor 26 may be reduced.

Figure 4:
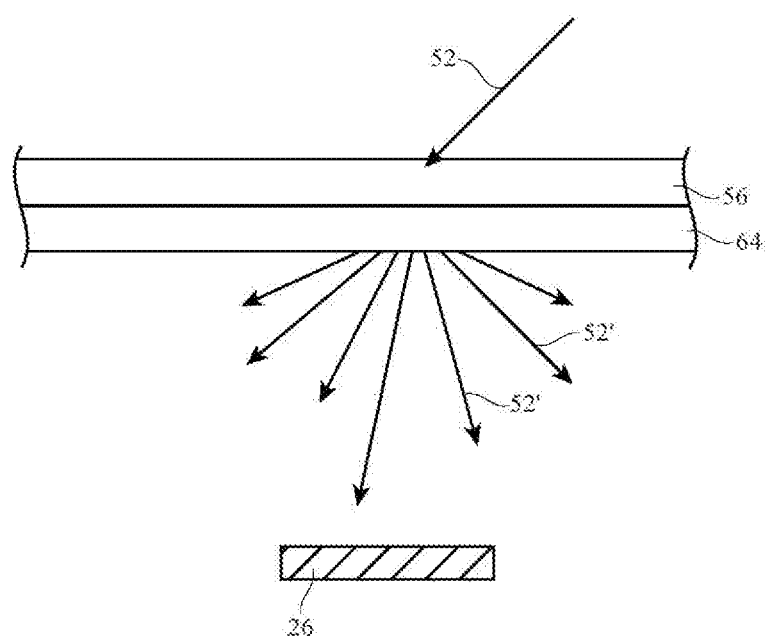
FIG. 4 is a cross-sectional side view of an illustrative light diffuser and visible-light-transmitting-and-infrared-light-blocking filter for an ambient light sensor in accordance with an embodiment.

FIG. 4 illustrates how light 52 may be diffused while passing through diffuser 56 and infrared light-blocking filer 64. As shown in FIG. 4, incoming ambient light rays such as ray 52 may be diffused when passing through diffuser 56 and filter 64 and may produce scattered rays 52' that are measured by sensor 26. The incorporation of light diffusing structures into the incoming, light path for ambient light 52 helps collect light by redirecting incoming off-axis light back towards sensor 26. The light diffusing structures of device 10 (e.g., diffuser 56) may exhibit a Lambertian scattering profile (e.g., radiance through diffuser 56 may be independent of the angle of incident light) or may exhibit a scattering profile that differs at any, angle of light incidence on the diffuser by less than 20% from a Lambertian scattering profile at that angle of light incidence (as examples).

Figure 5:
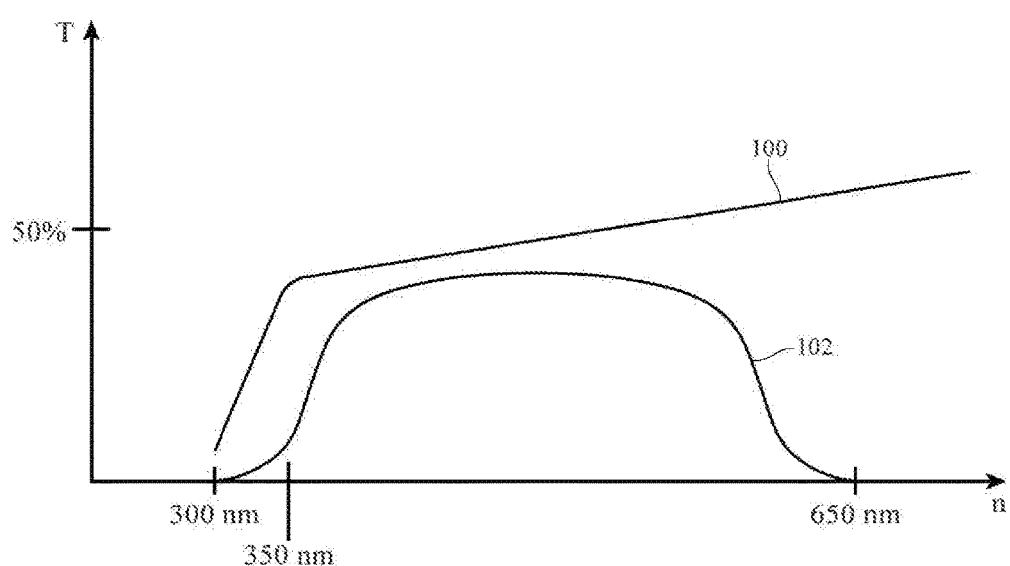
FIG. 5 is a graph of illustrative diffuser and infrared-light-blocking filter performance in accordance with an embodiment.

FIG. 5 is a graph showing an illustrative light transmission T that may be associated with diffuser 56 (curve 100) and that may be associated with diffuser 56 stacked with infrared-light-blocking filter 66 (curve 102). Infrared-light-blocking filter 66 may block light at wavelengths above 650 nm, above 700 nm, or at other suitable wavelengths. If desired, diffuser 56 may exhibit less diffusion (e.g., to enhance transmission T) and/or may exhibit more diffusion (e.g., to enhance light uniformity). In general, transmission T may be 30-70%, more than 40%, more than 60%, less than 70%, less than 50%, or other suitable values for visible light wavelengths. The configuration of FIG. 5 is merely illustrative.

Figure 6:
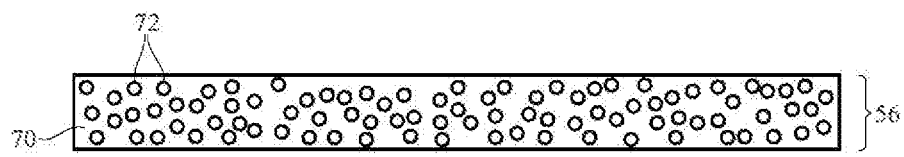
FIG. 6 is a cross-sectional side view of an illustrative diffuser having light diffusing desiccant particles in a substrate layer in accordance with an embodiment.

FIG. 6 is a cross-sectional side view of an illustrative light diffuser. In the illustrative configuration of FIG. 6, light diffuser 56 includes a substrate layer such as light diffuser substrate 70. Substrate 70 may, as an example, be a polymer film such as a film of polymethylmethacrylate or other polymer that is transparent to visible light. To help prevent moisture-induced degradation to substrate 70 while providing light-scattering centers that scattering ambient light 52, light-scattering desiccant particles 72 may be incorporated into substrate 70. Particles 72 may be, for example, particles of an inorganic material such as calcium chloride ($CaCl_2$) or silicon oxide ($SiO_2$) that have a different index of refraction than substrate 70 and that therefore scatter light 52 and that have water absorbing qualities that allow the material to serve as desiccant that reduces or eliminates moisture in substrate 70. If desired, desiccant particles 72 may be configured, to absorb infrared light while scattering visible light. In configurations in which infrared-light-absorbing desiccant particles block additional infrared light, dependence on the infrared-light-blocking filter 66 to block infrared light may be reduced.

Light-scattering desiccant particles 72 may be incorporated into a polymer such as the polymer of substrate 70 during manufacturing processes such as casting, extrusion, injection molding, rolling, etc. The diameters of particles 72 may be 10-50 microns, more than 5 microns, less than 100 microns, or other suitable size. Substrate 70 may have lateral dimensions of 0.2-2 mm, more than 0.3 mm, less than 1 mm, or other suitable size and may have a thickness of 100 microns, more than 0.05 mm, more than 0.1 mm, less than 1 mm, less than 0.5 mm, less than 0.2 mm, or other suitable size. If desired, non-desiccant light diffusing particles may also be incorporated into substrate 70 to enhance light diffusion (e.g., titanium dioxide particles or other particles that have a refractive index that differs from the refractive index of substrate 70 may be incorporated into substrate 70). Configurations in which particles 72 are light-scattering desiccant particles such as calcium chloride particles or silicon oxide particles may sometimes be described herein as an example.

Figure 7:
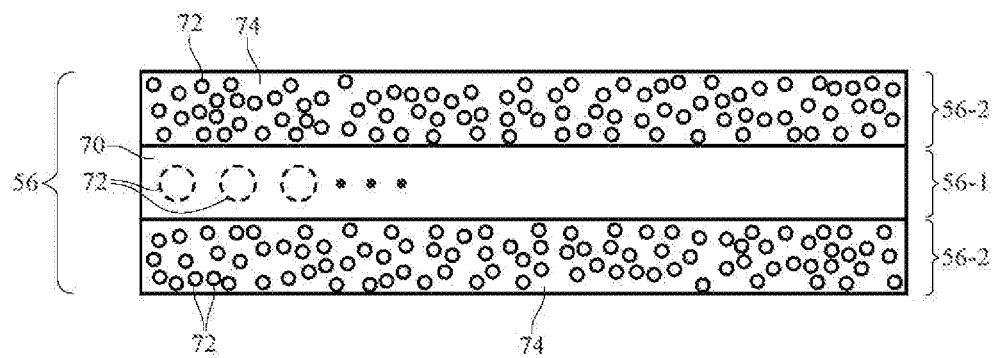
FIG. 7 is a cross-sectional side view of an illustrative diffuser having light diffusing polymer coatings with light-scattering desiccant particles on a substrate such as a polymer light diffuser substrate with optional light diffusing desiccant particles in accordance with an embodiment.

If desired, particles 72 may be provided in coating layers on one or both surfaces of substrate 70. Consider, as an example, the arrangement of light diffuser 56 of FIG. 7. In the example of FIG. 7, light diffuser 56 includes central layer 56-1 (e.g., a substrate layer) and one or more additional layers 56-2 (e.g., coating layers).

Layer 56-1 may be formed from polymer or other substrate material (e.g., material 70) and may include optional embedded light-scattering desiccant particles 72. Coatings 56-2 may be formed from binder material 74 (e.g., polymer) into which light-scattering desiccant particles 72 have been embedded. Binder material 74 may be glass or polymethylmethacrylate or other polymer and may, if desired, serve as an adhesive layer to help attach light diffuser 56 to other structures in device 10.

Figure 8:
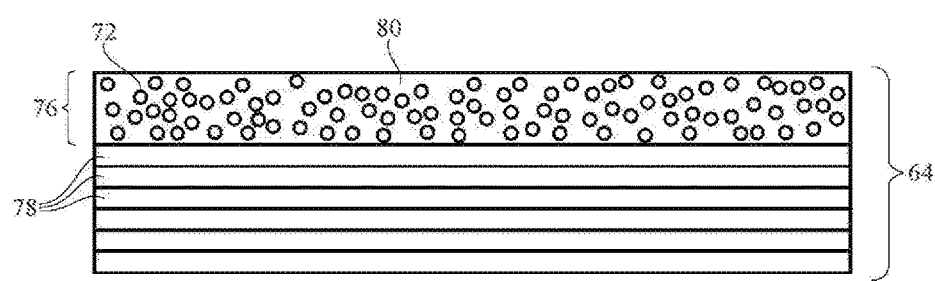
FIG. 8 is cross-sectional side view of an illustrative infrared-light-blocking thin-film interference filter formed on a filter substrate that includes light diffusing desiccant particles in accordance with an embodiment.

If desired, light-scattering desiccant particles 72 may be embedded within substrate 76 of infrared-light-blocking filter 64, as shown in FIG. 8. Filter 64 may include a stack of thin-film layers 78 on substrate 76. Thin-film layers 78 may include, for example organic dielectric layers or inorganic dielectric layers with alternating refractive index values (e.g., higher refractive index layers and lower refractive index layers). Thin-film layers 78 may form a stack containing 3-15 layers, 4-10 layers, more than 4 layers, fewer than 25 layers, or other suitable number of thin-film layers. Thin-film layers 78 may be configured to form a visible-light-transmitting-and-infrared-light blocking thin-film interference filter. If desired, a layer of bulk material that absorbs infrared light and transmits visible light may be incorporated into layers 78. Substrate 76 may include a substrate material such as substrate material 80 (e.g., glass or polymethylmethacrylate or other polymer) and optional embedded light-scattering desiccant particles 72. The incorporation of light-scattering particles in substrate 76 helps diffuse light 52. The incorporation of desiccant material in substrate 76 and filter 64 helps, reduce the vulnerability of filter 64 to degradation from moisture.

Figure 9:
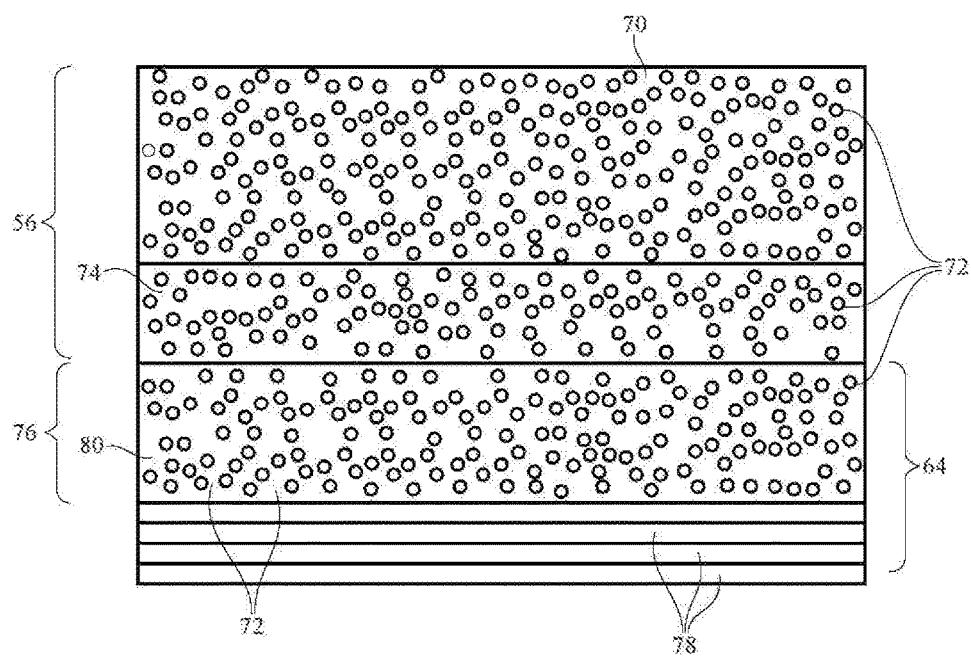
FIG. 9 is a cross-sectional side view of an illustrative light diffuser layer and infrared-light-blocking thin-film filter for an ambient light sensor in accordance with an embodiment.

FIG. 9 is a cross-sectional side view of illustrative light diffusing and infrared-light-blocking structures of the type that may be included in device 10. In the illustrative configuration of FIG. 9, light diffuser 56 has a substrate formed from polymer layer 70. Layer 70 may include light-scattering desiccant particles 72. Layer 74 (e.g., an adhesive layer formed from polymer material) may contain optional light-scattering particles 72 and may be used to attach light diffuser 56 to infrared-light-blocking filter 64. Infrared-light-blocking filter 64 may include substrate 76 (e.g., polymer 80 with optional embedded light-scattering desiccant particles 72) and may include a stack of thin-film interference filter layers 78 for forming a visible-light-passing-and-infrared-light-blocking thin-film interference filter on substrate layer 76. Layers 78 may, if desired, be interposed between layer 70 and layer 76. The configuration in which layer 76 is interposed between layer 74 and layers 78 is illustrative.

Figure 10:
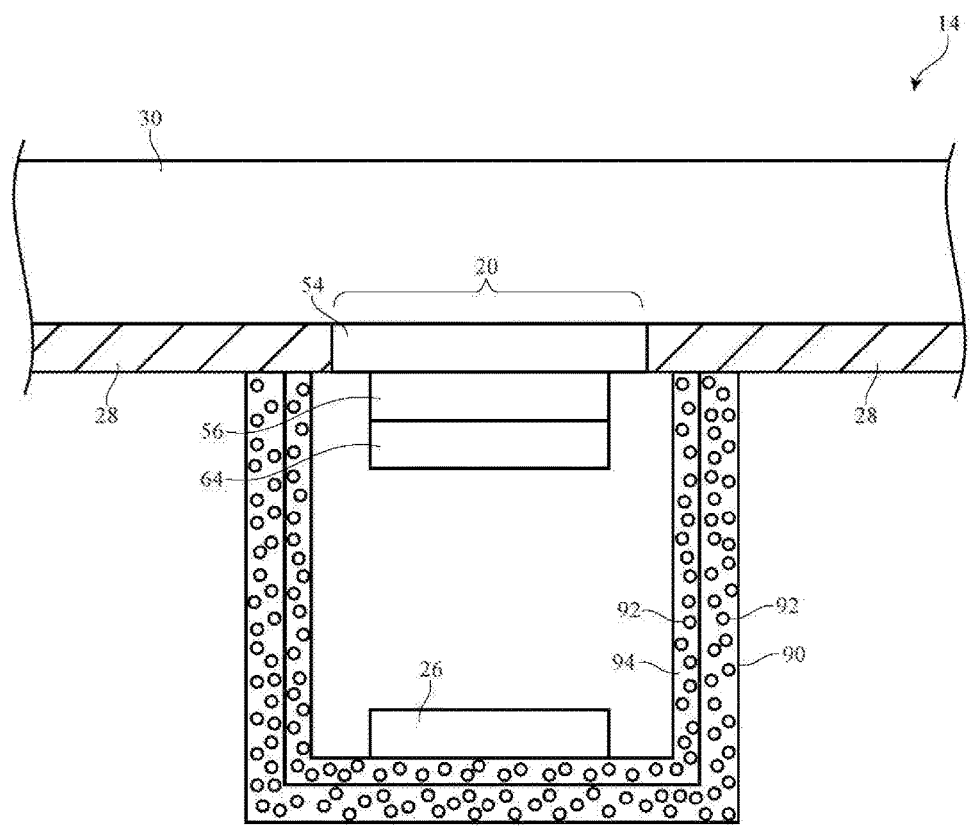
FIG. 10 is a cross-sectional side view of a portion of an electronic device with an illustrative ambient light sensing system in accordance with an embodiment.

FIG. 10 is a cross-sectional side view of an illustrative ambient light sensing system for device 10. In the example of FIG. 10, ambient light sensor 26 has been mounted in support structure 90 (sometimes referred to as an ambient light sensor boot). Support structure 90 may be used to mount sensor 26 under window 20 in display 14. Support structure 90 may be formed from black polymer or other suitable materials and may have the shape of a five-sided box (e.g., a box with an open top facing window 20) or other suitable shape. To help reduce the effects of moisture, desiccant (e.g., calcium chloride desiccant, silicon oxide desiccant, etc.) such as desiccant 92 may be embedded in support structure 90. Desiccant 92 may also be formed on the inner surface of support structure 90, as shown by illustrative polymer coating layer 94, which includes desiccant particles 92.

The foregoing is merely illustrative and various modifications can be made to the described embodiments. The foregoing embodiments may be implemented individually or in any combination.

What is claimed is:

1. An electronic device that is exposed to ambient light, comprising:
   a display that displays images;
   a housing in which the display is mounted;
   a light diffuser layer having a substrate formed from a polymer that includes a first set of light-scattering desiccant particles, wherein the substrate is in contact with a polymer coating layer having a second set of light-scattering desiccant particles embedded therein;
   an ambient light sensor in the housing configured to receive the ambient light through the polymer;

control circuitry configured to gather ambient light information with the ambient light sensor and configured to adjust the display based on the ambient light information; and an infrared-light-blocking filter having a polymer filter substrate, wherein the infrared-light-blocking filter comprises an infrared-light-blocking filter selected from the group consisting of: an infrared-light-blocking filter having a thin-film interference filter formed from a stack of inorganic dielectric layers on the polymer filter substrate and an infrared-light-blocking filter formed from a layer of infrared-light-absorbing material on the polymer filter substrate.

2. The electronic device defined in claim 1 wherein the polymer filter substrate includes a third set of embedded light-scattering desiccant particles and wherein the polymer filter substrate is attached to the substrate of the light diffuser layer by the polymer coating layer.

3. The electronic device defined in claim 1 wherein the infrared-light-blocking filter filters infrared light from the ambient light and allows visible light in the ambient light to pass to the ambient light sensor.

4. The electronic device defined in claim 3 wherein the light diffuser layer is separate from the polymer filter substrate.

5. The electronic device defined in claim 4 wherein the third set of light-scattering desiccant particles comprise light-scattering desiccant particles selected from the group consisting of: calcium chloride light-scattering desiccant particles and silicon oxide light-scattering desiccant particles.

6. The electronic device defined in claim 1 wherein the polymer filter substrate is formed from an additional polymer that includes a third set of light-scattering desiccant particles.

7. The electronic device defined in claim 6 wherein the third set of light-scattering desiccant particles comprise light-scattering desiccant particles selected from the group consisting of: calcium chloride light-scattering desiccant particles and silicon oxide light-scattering desiccant particles.

8. The electronic device defined in claim 1 wherein the first set of light-scattering desiccant particles comprise light-scattering desiccant particles selected from the group consisting of: calcium chloride light-scattering desiccant particles and silicon oxide light-scattering desiccant particles.

9. The electronic device defined in claim 8 wherein the second set of light-scattering desiccant particles are selected from the group consisting of: calcium chloride light-scattering desiccant particles and silicon oxide light-scattering desiccant particles.

10. The electronic device defined in claim 1 wherein the display comprises a display cover layer having an ambient light sensor window and wherein the ambient light sensor comprises a color ambient light sensor, the electronic device further comprising a support structure that supports the color ambient light sensor in alignment with the ambient light sensor window.

11. The electronic device defined in claim 10 further comprising desiccant in at least one of: the support structure and a coating on the support structure.

12. The electronic device defined in claim 11 wherein the first set of light-scattering desiccant particles are configured to absorb infrared light.

13. An electronic device configured to be exposed to ambient light, comprising:
a display;
a light diffuser layer with a polymer substrate having a first set of embedded light-scattering desiccant particles, wherein the polymer substrate is in contact with a polymer coating having a second set of embedded light-scattering desiccant particles; and
a color ambient light sensor configured to receive the ambient light through a portion of the display and through the light diffusing layer.

14. The electronic device defined in claim 13 wherein the first set of embedded light-scattering desiccant particles comprise calcium chloride particles.

15. The electronic device defined in claim 13 wherein the infrared-light-blocking filter is interposed between the light diffuser layer and the color ambient light sensor.

16. An ambient light sensor system configured to monitor ambient light, comprising:
a light diffusing layer having a polymer substrate containing a first set of light-scattering desiccant particles, wherein the polymer substrate is in contact with a polymer coating containing a second set of light-scattering desiccant particles;
an infrared-light-blocking filter layer; and
a semiconductor device containing light detectors configured to measure different colors of the ambient light received through the light diffusing layer and the infrared-light-blocking filter layer.

17. The ambient light sensor system defined in claim 16 wherein the infrared-light-blocking filter layer includes a polymer substrate and includes calcium chloride particles in the polymer substrate and wherein the infrared-light-blocking filter layer comprises an infrared-light-blocking filter layer selected from the group consisting of: an infrared-light-blocking filter layer having a thin-film interference filter formed from a stack of inorganic thin-film layers on the polymer substrate and an infrared-light-blocking filter layer having an infrared-light-blocking layer on the polymer substrate.

18. The ambient light sensor system defined in claim 16 wherein the first set of light-scattering desiccant particles are at least 10 microns in diameter.

* * * * *